(12) United States Patent
Johann et al.

(10) Patent No.: US 12,129,398 B2
(45) Date of Patent: Oct. 29, 2024

(54) PLASTISOL COMPOSITION COMPRISING A MIXTURE OF VARIOUS PLASTICIZERS

(71) Applicant: Henkel AG & Co. KGaA, Duesseldorf (DE)

(72) Inventors: Wolfgang Johann, Leimen/Gau-Angerlloch (DE); Alesandro Caruso, Sandhausen (DE); Nadine Bederke, Nussloch (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 368 days.

(21) Appl. No.: 17/455,050

(22) Filed: Nov. 16, 2021

(65) Prior Publication Data

US 2022/0073756 A1 Mar. 10, 2022

Related U.S. Application Data

(63) Continuation of application No. PCT/EP2020/063840, filed on May 18, 2020.

(30) Foreign Application Priority Data

May 24, 2019 (EP) ..................................... 19176528

(51) Int. Cl.
| | |
|---|---|
| C09D 7/61 | (2018.01) |
| B05D 1/02 | (2006.01) |
| C08F 14/06 | (2006.01) |
| C08K 5/11 | (2006.01) |
| C08K 5/42 | (2006.01) |
| C08K 7/28 | (2006.01) |
| C08K 13/04 | (2006.01) |
| C09D 5/02 | (2006.01) |
| C09D 7/40 | (2018.01) |
| C09D 7/63 | (2018.01) |
| C09D 127/06 | (2006.01) |

(52) U.S. Cl.
CPC .............. *C09D 5/021* (2013.01); *B05D 1/02* (2013.01); *C08F 14/06* (2013.01); *C08K 13/04* (2013.01); *C09D 7/61* (2018.01); *C09D 7/63* (2018.01); *C09D 7/70* (2018.01); *C09D 127/06* (2013.01); *C08K 5/11* (2013.01); *C08K 5/42* (2013.01); *C08K 7/28* (2013.01); *C08K 2201/014* (2013.01)

(58) Field of Classification Search
CPC . C09D 5/021; C09D 7/61; C09D 7/70; C09D 7/63; C09D 127/06; B05D 1/02; C08F 14/06; C08K 13/04; C08K 5/11; C08K 5/42; C08K 7/28; C08K 2201/014
USPC .................................................. 524/569, 903
See application file for complete search history.

(56) References Cited

FOREIGN PATENT DOCUMENTS

| | | | |
|---|---|---|---|
| CN | 107057213 A | * 8/2017 | |
| EP | 0692005 A1 | 1/1996 | |
| WO | WO-9422967 A1 | * 10/1994 | ............... C08K 9/10 |
| WO | WO-2014028481 A1 | * 2/2014 | ............... C08J 3/18 |

OTHER PUBLICATIONS

Van Oosterhout J. et al "Interactions between PVC and vinary or ternary blends of plasticizers. Part I. PVC/plasticizer compatibility" Polymer, Elsevier Science Publishers B.V., GB, Bd. 44, Nr. 26, Dec. 1, 2003, pp. 8081-8094.
International Search Report for PCT/EP2020/063840 mailed Oct. 21, 2020.
European Search Report for EP 19176528.8, dated Oct. 24, 2019.
Van Oosterhout J. et al."Interactions between PVC and vinary or ternary blends of plasticizers. Part I. PVC/plasticizer compatibility" Polymer, Elsevier Science Publishers B.V., GB, Bd. 44, Nr. 26, Dec. 1, 2003.

\* cited by examiner

*Primary Examiner* — Kelechi C Egwim
(74) *Attorney, Agent, or Firm* — Mary K. Cameron

(57) ABSTRACT

The present invention relates to a plastisol composition comprising polyvinyl chloride and a mixture of various plasticizers, and to the use thereof as an underbody coating and for scaling seams.

18 Claims, No Drawings

PLASTISOL COMPOSITION COMPRISING A MIXTURE OF VARIOUS PLASTICIZERS

The present invention relates to a plastisol composition comprising polyvinyl chloride and a mixture of various plasticizers, and to the use thereof as an underbody coating and for sealing seams.

In order to protect the underbody of vehicles, in particular automobiles, from damage, the corresponding regions are provided with a protective lacquer. The same applies to weld seams, which are provided with a seam-sealing compound to protect against the ingress of dirt and moisture. However, these measures often prove to be inadequate when stones, chippings, or similar objects thrown up by the tires at high driving speeds hit the coating and, despite high hardness and elasticity, penetrate as far as the underbody or the seam. These impact points, which are often only tiny, form starting points for rust, which over time can also spread under the protective lacquer and cause severe damage to the vehicle.

Good results have been achieved with protective coatings based on plastisols, i.e. dispersions of organic plastics in plasticizers which gel when heated to higher temperatures and cure when cooled, in particular when compounds based on phthalates as plasticizers are used, diisononyl phthalate (DINP) having become established as a common plasticizer.

WO 2014/028481 discloses a plastisol in which polyvinyl chloride (PVC), plasticizer and a liquid trimethylolpropane-trimethylacrylate resin are mixed, the plastisol having a hardness according to ASTM D2240 of less than 12 shore A and an elongation at break according to ASTM D412 of more than 400%.

In "Interactions between PVC and binary or ternary blends of plasticizer. Part I PVC/plasticizer compatibility," published in Polymer 44 (2003) 8081-8094, Van Ooosterhout et al describe tests regarding transition temperatures from solid to gel-like of polyvinyl chloride in binary and ternary plasticizer mixtures.

CN 107 057 213 discloses an elastic PVC composite pipe and a corresponding manufacturing method. The PVC composite pipe comprises an inner pipe, an outer pipe, and a reinforcing layer which is arranged between the inner pipe and the outer pipe. The inner pipe, the outer tube, and the reinforcing layer are made from a mixture which contains, inter alia, 40 to 60 parts polyvinyl chloride, 30 to 40 parts dibutyl phthalate, and 3 to 5 parts diisooctyl adipate.

EP 0 692 005 discloses coating compositions for underbody coating and protection against stone chipping in motor vehicles, the composition being 20 to 40 wt. % PVC resin (PVC/PVAc), 1 to 3 wt. % hot-swelling agent consisting of an acrylonitrile/acrylic ester/olefin copolymer in which a suitable amount of a $C_4$-$C_6$ alkane is encapsulated, and comprising a phenolic resin.

Recently, however, phthalate-containing plasticizers have repeatedly come into the spotlight due to health concerns and were on the verge of being banned, at least in Europe. The phthalate-containing plasticizers have high bioaccumulation potential and some animal experiments have shown them to be chronically toxic. Reproductive toxicity could not be ruled out either. Although there are no indications of an acute risk to humans, DINP, for example, cannot be used in children's toys as a precaution. Although DINP can still be used in industrial production, there is still a need for protective coatings that are free of phthalate-containing compounds and still suitable as an underbody coating or for seam covering.

The problem addressed by the present invention is therefore that of providing a protective coating which is free from phthalate-containing compounds, but which nevertheless exhibits properties comparable to phthalate-containing protective coatings and is suitable as an underbody coating and for covering seams.

In initial attempts using phthalates with an alkyl chain length of more than 11 carbon atoms, which are considered to be harmless, no satisfactory protective effects could be achieved. Attempts to replace the phthalate-containing plasticizers with those based on citrate were also unsuccessful, as the citrate compounds reacted with the calcium compounds in the formulations, causing these formulations to become unstable.

In the context of the present invention, it has now surprisingly been found that the aforementioned problem is solved by a plastisol composition which has a mixture of various plasticizers.

The present invention therefore firstly relates to a plastisol composition comprising polyvinyl chloride and a mixture of alkyl sulfonic acid phenyl ester, alkyl disulfonic acid diphenyl ester, and di-octyl adipate as plasticizers.

It has surprisingly been found that the necessary properties of DINP in underbody coating and seam sealing can be reproduced very well through the combination of various plasticizers considered to be harmless, such as alkyl sulfonic acid phenyl ester, alkyl disulfonic acid diphenyl ester, and di-octyl adipate.

The plastisol composition according to the invention acts as a replacement for the compositions containing phthalate-containing plasticizers which are usually used. The use of such compounds could be completely dispensed with in the context of the present invention. An embodiment in which the plastisol composition according to the invention is free from phthalate-containing compounds is therefore preferred.

In order to reproduce the properties usually associated with DINP, it has proven to be advantageous for the composition to have a certain minimum proportion of plasticizers. Accordingly, an embodiment is preferred in which the plastisol composition according to the invention has at least 20 wt. %, preferably at least 30 wt. %, of plasticizers, based on the total weight of the composition in each case.

Furthermore, it has proven to be advantageous if, in addition to alkyl sulfonic acid phenyl ester and di-octyl adipate, alkyl disulfonic acid diphenyl ester is added to the composition according to the invention. The composition according to the invention therefore also comprises alkyl disulfonic acid diphenyl ester.

When using phthalate-containing compounds as plasticizers, those with alkyl chains of up to 11 carbon atoms have proven particularly advantageous. A significant decrease in the protective effect of such compositions in underbody coating was observed when using longer-chain phthalates. In contrast, it was surprisingly found within the scope of the present invention that the advantageous properties of phthalate-containing plasticizers can be reproduced particularly well when alkyl sulfonic acid phenyl ester and/or alkyl disulfonic acid diphenyl ester with an alkyl chain length of more than 10 carbon atoms is used. An embodiment of the present invention is therefore preferred in which the alkyl sulfonic acid phenyl ester and/or alkyl disulfonic acid diphenyl ester has an alkyl chain length of at least 10 carbon atoms, preferably 10 to 21 carbon atoms.

It has surprisingly been found that the product properties of the composition according to the invention can be adjusted via the mixing ratio of the plasticizers. In a preferred embodiment, the proportion of alkyl sulfonic acid phenyl ester in the composition according to the invention is therefore 3 to 35 wt. %, preferably 7 to 25 wt. %, based on the total weight of the composition in each case.

Also preferred is an embodiment of the composition according to the invention in which the proportion of alkyl disulfonic acid diphenyl ester in the composition is 0.5 to 10 wt. %, preferably 1 to 7 wt. %, based on the total weight of the composition in each case.

The alkyl sulfonic acid phenyl ester and alkyl disulfonic acid diphenyl ester are preferably present in the composition in a weight ratio of 5:1 to 10:1, preferably 3:1 to 7:1.

In a further preferred embodiment, the composition according to the invention has a proportion of di-octyl adipate of 5 to 40 wt. %, preferably 10 to 25 wt. %, based on the total weight of the composition in each case.

The weight ratio of the sum of alkyl sulfonic acid phenyl ester and alkyl disulfonic acid diphenyl ester to di-octyl adipate in the mixture according to the invention is preferably 0.8:1 to 1:5, particularly preferably 1.2:1 to 1:2.

The plastisol composition according to the invention is a composition based on polyvinyl chloride. In a preferred embodiment, the proportion of polyvinyl chloride in the composition according to the invention is 5 to 50 wt. %, preferably 10 to 40 wt. %, based on the total weight of the composition in each case.

In a particularly preferred embodiment, the composition according to the invention comprises
- 3 to 35 wt. %, preferably 7 to 25 wt. %, alkyl sulfonic acid phenyl ester;
- 0.5 to 10 wt. %, preferably 1 to 7 wt. %, alkyl disulfonic acid diphenyl ester;
- 5 to 40 wt. %, preferably 10 to 25 wt. %, di-octyl adipate; and
- 5 to 50 wt. %, preferably 10 to 40 wt. %, polyvinyl chloride, the wt. % specifications relating to the total weight of the composition in each case.

The composition according to the invention is designed in particular as an underbody coating and seam-sealing material for vehicle construction. The coatings are usually applied by being sprayed on so as to form the desired protective film after curing. As a rule, these compositions are in the form of pastes and are sprayed under pressure by means of nozzles. An embodiment is therefore preferred in which the composition according to the invention is in the form of a paste, which is preferably sprayable.

In order to minimize the additional weight caused by the protective coating, it is desirable for the respective compositions to have a low density. A reduction in density can be achieved by introducing hollow microspheres, for example. Therefore, an embodiment is preferred in which the composition according to the invention further comprises hollow microspheres, preferably in an amount of 0 to 40 vol. %, particularly preferably 5 to 30 vol. %, based on the total volume of the composition in each case. Hollow spheres made of plastic, which are characterized by their low weight, are generally used. However, these have the disadvantage that they are partially compressed during the application process, in which the composition is sprayed under pressure, which ultimately means that more material is required to achieve the desired layer thickness. In the context of the present invention, it was surprisingly found that this disadvantage can be compensated for by using hollow spheres made of glass. An embodiment is therefore preferred in which the hollow spheres are hollow glass spheres, preferably pressure-stabilized hollow glass spheres.

In order to adapt the properties and the processability of the composition according to the invention, further constituents, for example fillers and/or adhesion promoters, can be added thereto. In a particularly preferred embodiment, the composition according to the invention therefore also has fillers, preferably those selected from the group consisting of calcium carbonate, calcium oxide, silicic acid, titanium dioxide, zinc oxide, and mixtures thereof.

The composition according to the invention is designed in particular for use as an underbody coating and for sealing seams. The present invention therefore also relates to the use of the composition according to the invention as an underbody coating for vehicles, in particular automobiles, and/or for sealing seams, in particular weld seams.

The composition according to the invention will be explained in more detail with reference to the following example, which should not be understood as a restriction of the inventive concept.

EXAMPLE

A low-density composition according to the invention having the constituents shown in Table 1 was subjected to various tests in order to verify its suitability, in particular as a seam-sealing material. The specifications in the table relate to the total weight of the composition in each case.

TABLE 1

| Component | Amount [wt. %] |
| --- | --- |
| Alkyl sulfonic acid phenyl ester | 16 |
| Alkyl disulfonic acid diphenyl ester | 4 |
| Polyvinyl chloride | 30 |
| Di-octyl adipate | 17.5 |
| Fillers | 23 |
| Additives | 9.5 |

The properties of the composition according to the invention were implemented according to standardized automotive industry tests, as described below.

Stability/Slip Behavior

The seam-sealing compound was applied to an electrolytically galvanized, CDP-coated steel sheet measuring 100×200 mm in the form of a 180 mm strip parallel to the longitudinal edge of the test sheet using a film applicator with a gap width of 80 mm and a defined gap height (wet-film thickness). Immediately after application, the test sheet provided with seam-sealing compound was stored hanging freely at room temperature for 20 minutes. Immediately after the storage at room temperature, the metal sheet provided with seam-sealing compound was exposed to a temperature load of 60° C. in a dryer for 5 minutes. This was followed by a temperature load of 140° C. for 20 minutes. The test sheet was then used to measure whether and how far the applied seam-sealing compound has slipped off the lower edge of the test sheet. The slip distance is given in mm.

The requirements for stability, as specified by the automotive industry in accordance with DBL 6070, were fully met by the composition according to the invention, i.e. no slipping over the edge could be established.

Flexural Strength

Another property that seam-sealing compounds in the automotive sector must have is a certain flexural strength in order to prevent the seal from cracking under load. In the past, the flexural strength at low temperatures in particular has often proven to be problematic. Surprisingly, however, no crack formation could be observed in the composition according to the invention, even at temperatures of up to −40° C.

The flexural strength was determined as follows: The seam-sealing compound was applied to an electrolytically galvanized, CDP-coated steel sheet measuring 50×200 mm in the form of a 180 mm strip parallel to the longitudinal edge of the test sheet using a film applicator with a gap width of 50 mm and a gap height of 1 mm. The test sheet provided with the seam-sealing compound was dried for 50 minutes at 160° C. (object temperature). The flexural strength was then tested in accordance with DIN EN ISO 1519 over a 25 mm mandrel at room temperature, −20° C., and −40° C. In the case of the composition according to the invention, neither cracking nor other damage to the film of material could be observed at any of the test temperatures.

Tensile Strength/Elongation at Break

The tensile strength and elongation at break are determined in accordance with DIN 53 504 with a clamping length of 50 mm and an extension speed of 100 mm/min. In the case of the composition according to the invention, the tensile strength clearly exceeded the 2.4 MPa required in the automotive industry. The required elongation at break of more than 180% was also clearly exceeded in the case of the composition according to the invention; the composition according to the invention therefore also meets the automotive industry requirements for seam-sealing compounds with regard to these properties.

Overcoatability

Seam-sealing materials in automotive engineering usually serve as a base for further coatings, for example paints. It is therefore important that they are easy to overcoat, i.e. that the top coat does not flake off. In connection with the composition according to the invention, no flaking of the top layer was observed under test conditions either for a conventional structure composed of filler, waterborne coating, and a 2K clear coat or an integrated lacquer consisting of a first basecoat, a second basecoat, and a 2K clear coat.

To check the overcoatability, the composition according to the invention was applied in a wedge shape to an electrolytically galvanized, CDP-coated test sheet in the form of a 180 mm strip parallel to the longitudinal edge of the test sheet using a film applicator with a gap width of 80 mm and a gap height of 0 to 3 mm. Immediately after application, the composition was provided with the respective lacquers and conditioned in a standard climate in accordance with DIN EN 23 270 for at least 16 hours. After conditioning, the test sheets were stored for 240 hours in a constant condensed water climate in accordance with DIN EN ISO 6270-2-CH. At the end of the test period, the samples were conditioned at room temperature for at least 16 hours. After the regeneration time had elapsed, the samples were subjected to the multi-impact test in accordance with DIN EN ISO 20567-1 and evaluated. No abnormalities, such as flaking of the top layer, could be found.

What is claimed is:

1. A plastisol composition, comprising polyvinyl chloride and a mixture of alkyl sulfonic acid phenyl ester, alkyl disulfonic acid diphenyl ester, and di-octyl adipate as plasticizers.

2. The plastisol composition according to claim 1, wherein the composition is free from phthalate-containing compounds.

3. The plastisol composition according to claim 1, wherein the amount of plasticizers in the composition is at least 20 wt. %, based on total weight of the composition.

4. The plastisol composition according to claim 1, wherein the alkyl sulfonic acid phenyl ester and alkyl disulfonic acid diphenyl ester are present in the composition in a weight ratio of 5:1 to 10:1.

5. The plastisol composition according to claim 1, wherein the alkyl sulfonic acid phenyl ester and/or the alkyl disulfonic acid diphenyl ester have a chain length of 10 to 21 carbon atoms.

6. The plastisol composition according to claim 1, wherein the proportion of alkyl sulfonic acid phenyl ester in the composition is 3 to 35 wt. % based on the total weight of the composition in each case.

7. The plastisol composition according to claim 1, wherein the proportion of alkyl disulfonic acid diphenyl ester in the composition is 0.5 to 10 wt. %, based on the total weight of the composition.

8. The plastisol composition according to claim 1, wherein the proportion of di-octyl adipate in the composition is 5 to 40 wt. %, based on the total weight of the composition.

9. The plastisol composition according to claim 1, wherein the proportion of polyvinyl chloride in the composition is 5 to 50 wt. %, based on the total weight of the composition in each case.

10. The plastisol composition according to claim 1, wherein the composition comprises:
   3 to 35 wt. % alkyl sulfonic acid phenyl ester;
   0.5 to 10 wt. % alkyl disulfonic acid diphenyl ester;
   5 to 40 wt. % di-octyl adipate; and
   5 to 50 wt. % polyvinyl chloride:
based on total weight of the composition in each case.

11. The plastisol composition according to claim 10, wherein the composition comprises:
   7 to 25 wt. % alkyl sulfonic acid phenyl ester;
   1 to 7 wt. % alkyl disulfonic acid diphenyl ester;
   10 to 25 wt. % di-octyl adipate; and
   10 to 40 wt. %, polyvinyl chloride; and
wherein the alkyl sulfonic acid phenyl ester and alkyl disulfonic acid diphenyl ester are present in a weight ratio of 5:1 to 10:1.

12. The plastisol composition according to claim 1, wherein the composition further comprises hollow spheres in an amount up to 40 vol. %, based on total volume of the composition.

13. The plastisol composition according to claim 12, wherein at least a portion of the hollow spheres are pressure-stabilized hollow glass spheres.

14. The plastisol composition according to claim 1, wherein the composition is in the form of a sprayable paste.

15. The plastisol composition according to claim 1, wherein the composition comprises further components comprising fillers and/or adhesion promoters.

16. The plastisol composition according to claim 15, wherein the fillers are selected from the group consisting of calcium carbonate, calcium oxide, silicic acid, titanium dioxide, zinc oxide, and mixtures thereof.

17. An automobile underbody coating or weld seam sealer comprising the plastisol composition according to claim 1.

18. A method of sealing a weld seam or coating an automobile underbody comprising steps of:
   a. spraying a plastisol composition according to claim 1 onto a weld seam or automobile underbody;
   b. drying the plastisol composition to form a protective film on the weld seam or automobile underbody; and
   c. optionally, overcoating the protective film with a coating;

wherein the plastisol composition is free of phthalate-containing compounds.

* * * * *